Oct. 3, 1961 — L. B. ALLEN — 3,002,665
ARTICLE RECEPTACLE FOR AUTOMOBILES
Filed Nov. 16, 1959 — 2 Sheets-Sheet 1

INVENTOR
Lyndon B. Allen
BY Cecil L. Wood
ATTORNEY

Oct. 3, 1961 L. B. ALLEN 3,002,665
ARTICLE RECEPTACLE FOR AUTOMOBILES
Filed Nov. 16, 1959 2 Sheets-Sheet 2

INVENTOR
Lyndon B. Allen
BY
ATTORNEY

United States Patent Office 3,002,665
Patented Oct. 3, 1961

3,002,665
ARTICLE RECEPTACLE FOR AUTOMOBILES
Lyndon B. Allen, 322 Johnson Blvd., Shreveport, La.
Filed Nov. 16, 1959, Ser. No. 853,057
1 Claim. (Cl. 224—42.42)

This invention relates to an article receptacle, and it concerns more particularly a receptacle for miscellaneous articles for installation in an automobile.

An object of the invention is to provide a receptacle adapted to contain small items which are often carried in an automobile, such as bottles, diapers, candy bars, whereby excessive cluttering of the automobile is avoided.

Another object of the invention is to provide a receptacle as described having means whereby it is adapted to be supported above a central longitudinal hump formed in the floor of an automobile, above the drive shaft thereof, forwardly of the front seat.

Another object of the invention is to provide a receptacle as described having means whereby it is adapted to be suspended from the lower edge of the instrument panel of an automobile, and having other means whereby it is adapted to be attached to the forward edge of the front seat thereof, and still other means whereby it is adapted to be secured to the back of the front seat.

Another object of the invention is to provide a receptacle as described which is characterized by its simple, sturdy construction, is adapted to be fabricated economically, and is efficient in operation and durable in use.

The invention will be readily understood by referring to the following description and the accompanying drawing, in which.

Figure 9:
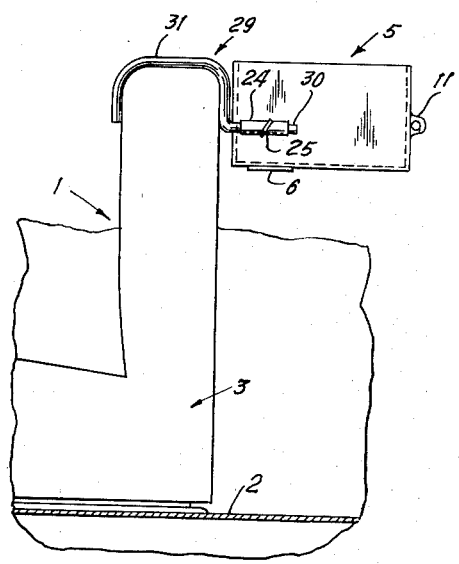
FIGURE 9 is a view similar to FIGURE 1, showing means whereby the receptacle is adapted to be secured to the back of the front seat of the automobile.
Figure 10:
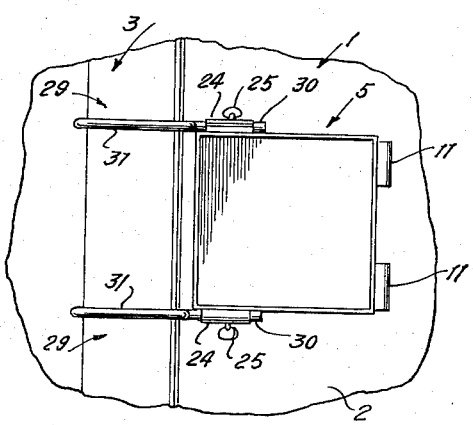
Figure 11:
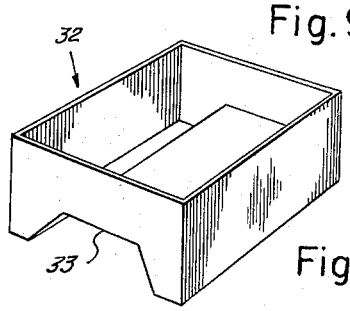

FIGURE 10 is a top plan view showing a portion of the apparatus illustrated in FIGURE 9; and FIGURE 11 is a perspective view of a receptacle having a raised central bottom portion, coextensive with its length, which is conformable to the central longitudinal hump formed in the floor of an automobile, above the drive shaft thereof, forwardly of the front seat, whereby the receptacle is adapted to straddle the hump.

Figure 1:
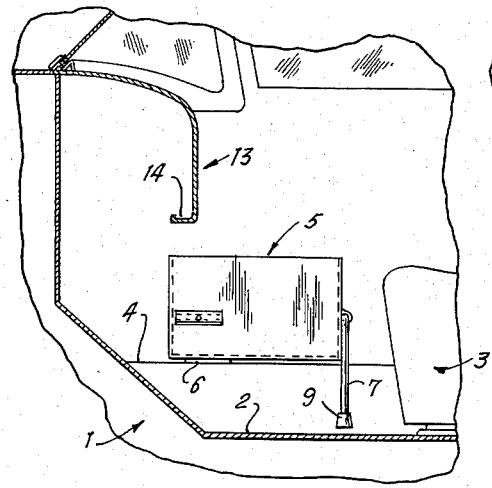
FIGURE 1 is a longitudinal sectional elevational view showing an automobile fragmentarily, and showing a receptacle embodying the invention having means whereby it is adapted to be supported above a central longitudinal hump formed in the floor of the automobile, above the drive shaft thereof, forwardly of the front seat.
Figure 3:
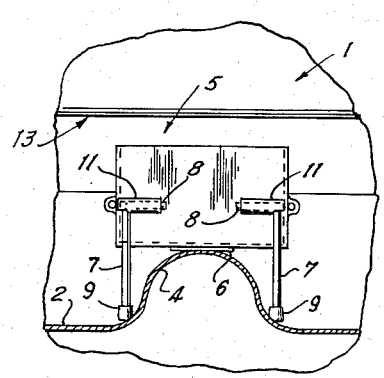
FIGURE 3 is a transverse sectional elevational view showing a portion of the apparatus illustrated in FIGURE 1.
Figure 5:
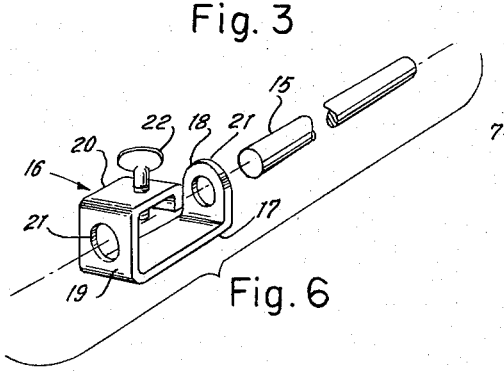
FIGURE 5 is an exploded perspective view, on an enlarged scale, showing a portion of the apparatus illustrated in FIGURE 1.

Referring to FIGURES 1, 3 and 5 of the drawing, the numeral 1 designates generally an automobile having a floor 2 and a front seat 3. The floor 2 has a central longitudinal hump 4 formed therein, above the drive shaft (not shown), forwardly of the front seat 3.

The numeral 5 indicates generally a receptacle embodying the invention. The receptacle 5 is substantially square, and is open at the top. A pad 6, which is attached to the bottom of the receptacle 5, adjacent one side thereof, is adapted to rest on the hump 4, whereby the receptacle 5 is supported in part on the hump 4.

A pair of legs 7, which are removably connected to the side of the receptacle 1 opposite said one side thereof, in spaced apart relation to each other, are adapted to straddle the hump 4, and are engageable with the floor 2 on opposite sides of the hump 4, whereby the receptacle 1 is additionally supported and is prevented from being displaced laterally relative to the hump 4.

The legs 7 each consist of an elongated rod which is bent right angularly adjacent its upper end, as at 8, and has a rubber foot 9 applied to its lower end. The end portions 8 of the legs 7, which are normally disposed horizontally, are received in tubular sockets 10 therefor in integral lugs 11 which extend outwardly from the adjacent side of the receptacle 1. The lugs 11 each have a slot 12 in its under side communicating with the socket 10 adjacent its outer end and for engagement with a leg 7 saving its end portion 8 received in the socket 10, whereby the leg 7 is prevented from being rotated in the socket 10 about its end portion 8.

Figure 2:
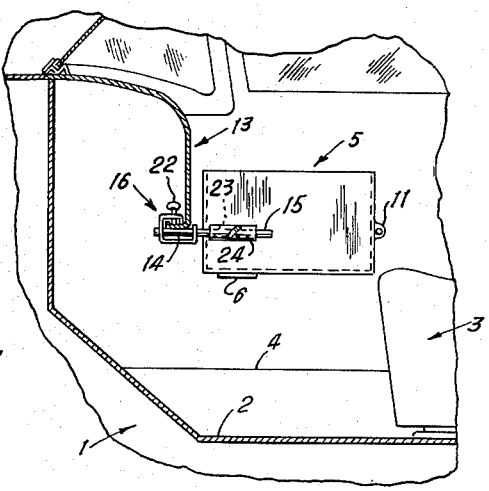
FIGURE 2 is a view similar to FIGURE 1, showing means whereby the receptacle is adapted to be suspended from the lower edge of the instrument panel of the automobile.
Figure 4:
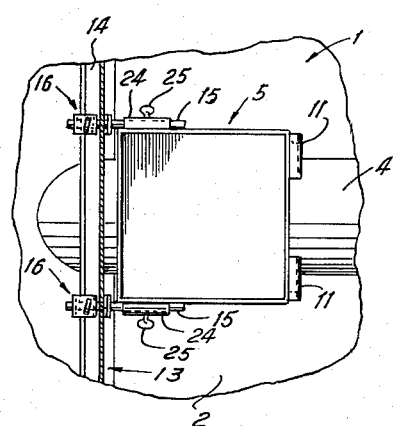
FIGURE 4 is a sectional plan view showing a portion of the apparatus illustrated in FIGURE 2.
Figure 6:
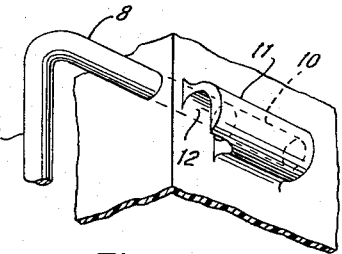
FIGURE 6 is an exploded perspective view, on an enlarged scale, showing a portion of the apparatus illustrated in FIGURE 2.

Referring to FIGURES 2, 4 and 6 of the drawing, the automobile 1 has an instrument panel, which is indicated generally by the numeral 13. The instrument panel 13 has an inwardly extending horizontal flange 14 adjacent its lower edge.

A pair of elongated rods 15 each have one of its ends removably connected to the instrument panel 13, below the flange 14, by means of a clamping device 16, as hereinafter described, and extend horizontally outwardly therefrom.

The clamping devices 16 each consist of an angularly bent strip having a normally horizontally extending first intermediate portion 17 arranged transversely of the instrument panel 13, below the flange 14, a first end portion 18 extending upwardly from the first intermediate portion 17 and positioned outwardly of the instrument panel 13, a second intermediate portion 19 extending upwardly from the first intermediate portion 17 and positioned inwardly of the flange 14, and a horizontally extending second end portion 20 connected to the second intermediate portion 19 and overlying the flange 14. The first end portion 18 and the second intermediate portion 19 have aligned openings 21 therein through which the adjacent end of one of the rods 15 is passed. A thumb screw 22, which is received in a threaded opening therefor in the second end portion 20, is engageable with the upper surface of the flange 14, whereby the rod 15 is clamped in engagement with the under side thereof.

The ends of the rods 15 opposite the clamping devices 16 are received in tubular sockets 23 therefor in integral lugs 24 which extend outwardly from two opposite sides of the receptacle 1, whereby the receptacle 1 is adapted to be supported on the rods 15. A pair of thumb screws 25, each of which is received in a threaded opening therefor in one of the lugs 24, are engageable with the respective rods 15, whereby the receptacle 1 is removably secured thereto.

Figure 7:
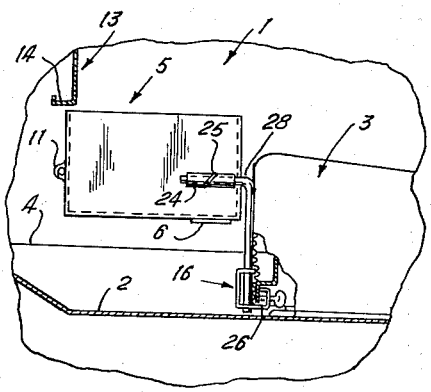
FIGURE 7 is a view similar to FIGURE 1, showing means whereby the receptacle is adapted to be attached to the forward edge of the front seat of the automobile.
Figure 8:
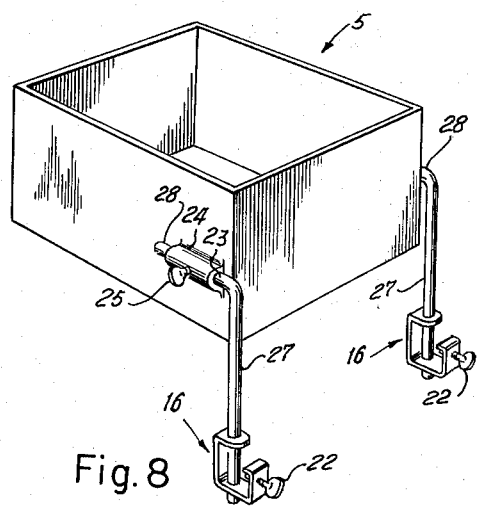
FIGURE 8 is a perspective view, on an enlarged scale, showing a portion of the apparatus illustrated in FIGURE 7.

Referring to FIGURES 7 and 8 of the drawing, the front seat 3 has a depending flange 26 which extends along its lower edge. A pair of legs 27, which are similar to the legs 7 shown in FIGURES 1, 3 and 5, and are bent right angularly adjacent their upper ends, as at 28, have their upper ends received in the tubular sockets 23 of the legs 24, and have their lower ends removably connected to the flange 26 by a pair of clamping devices 16, whereby the receptacle 1 is adapted to be supported on the flange 26.

Referring to FIGURES 9 and 10 of the drawing, a pair of rods 29 have normally horizontally extending end portions 30 which are receivable in the tubular sockets 23 of the lugs 24, and are bent angularly intermediate their ends to form hook portions 31 which are adapted to overlie the top of the front seat 3, whereby the receptacle 1 is adapted to be secured to the back of the front seat 3.

Referring to FIGURE 11 of the drawing, the numeral 32 indicates generally a receptacle having a raised central bottom portion 33, coextensive with its length, which is conformable to the hump 4, whereby the receptacle 32 is adapted to straddle the hump 4. As shown, the raised central bottom portion 33 extends between two opposite sides of the receptacle 32, and forms an inverted channel having upwardly and inwardly inclined side walls.

The invention may be modified in various ways without departing from the spirit and scope thereof.

What is claimed is:

In a receptacle for miscellaneous articles, for installation in an automobile, the combination of a substantially rectangular receptacle, open at the top, having a pad secured to its bottom, adjacent one side thereof, engageable with a central longitudinal hump formed in the floor of an automobile, whereby the receptacle is adapted to be supported thereon, and having a pair of legs removably connected to the side of the receptacle opposite said one side thereof, in spaced apart relation to each other, adapted to straddle the hump whereby the receptacle is prevented from being displaced laterally relative thereto, the legs consisting of elongated rods which are bent right angularly adjacent their upper ends to form normally horizontally extending upper end portions, said end portions extending parallel to the last mentioned side of the receptacle and being received in tubular sockets therefor in integral lugs extending outwardly from said last mentioned side, the lugs having slots in their under sides communicating with the respective sockets adjacent their outer ends for engagement with the legs whereby the legs are prevented from being rotated in the sockets about said end portions, the legs having resilient feet engageable with the floor of the automobile on opposite sides of the hump.

References Cited in the file of this patent

UNITED STATES PATENTS

| | | |
|---|---|---|
| 1,460,760 | McGee | July 3, 1923 |
| 1,890,729 | Ganson | Dec. 13, 1932 |
| 2,499,103 | Love | Feb. 28, 1950 |
| 2,744,667 | Maloney | May 6, 1956 |
| 2,843,301 | Worthen | July 15, 1958 |
| 2,884,174 | Davitt | Apr. 28, 1959 |
| 2,899,162 | Young | Aug. 11, 1959 |

FOREIGN PATENTS

| | | |
|---|---|---|
| 571,939 | Great Britain | Sept. 14, 1945 |